United States Patent
Sritharan et al.

(10) Patent No.: US 9,016,012 B1
(45) Date of Patent: Apr. 28, 2015

(54) WIND TURBINE TOWER SYSTEM

(75) Inventors: Sivalingam Sritharan, Ames, IA (US); Thomas James Lewin, Overland Park, KS (US)

(73) Assignee: Iowa State University Research Foundation, Inc., Ames, IA (US)

( * ) Notice: Subject to any disclaimer, the term of this patent is extended or adjusted under 35 U.S.C. 154(b) by 136 days.

(21) Appl. No.: 13/478,497

(22) Filed: May 23, 2012

Related U.S. Application Data

(60) Provisional application No. 61/488,939, filed on May 23, 2011.

(51) Int. Cl.
*E04H 12/00* (2006.01)
*E04H 12/12* (2006.01)
*E04H 12/16* (2006.01)
*E04H 12/14* (2006.01)

(52) U.S. Cl.
CPC ............. *E04H 12/12* (2013.01); *E04H 12/16* (2013.01); *E04H 12/14* (2013.01)

(58) Field of Classification Search
CPC .......... E04H 12/12; E04H 12/14; E04H 12/16
USPC .................................... 52/651.01, 40, 651.07
See application file for complete search history.

(56) References Cited

U.S. PATENT DOCUMENTS

| | | | |
|---|---|---|---|
| 6,467,233 B1 | 10/2002 | Maliszewski et al. | |
| 7,739,843 B2 * | 6/2010 | Cortina-Cordero | 52/223.5 |
| 7,765,766 B2 * | 8/2010 | Gomez et al. | 52/745.04 |
| 7,770,343 B2 | 8/2010 | Montaner Fraguet et al. | |
| 7,993,107 B2 * | 8/2011 | Gevers | 416/244 R |
| 8,256,174 B2 * | 9/2012 | Irniger et al. | 52/245 |
| 8,511,013 B2 * | 8/2013 | Voss | 52/223.5 |
| 2006/0213145 A1 | 9/2006 | Haller | |
| 2006/0273597 A1 | 12/2006 | Rashidi | |
| 2009/0016897 A1 | 1/2009 | Olgaard | |
| 2011/0133475 A1 * | 6/2011 | Zheng et al. | 290/55 |

FOREIGN PATENT DOCUMENTS

WO   WO 2006/133122 A2   12/2006

OTHER PUBLICATIONS

Lohaus, L. et al., "High-cycle Fatigue of "Ultra-High Performance Concrete" and "Grouted Joints" for Offshore Wind Energy Turbines", Proceedings of the Euromech Colloquim, 2007.

* cited by examiner

*Primary Examiner* — Andrew J Triggs
(74) *Attorney, Agent, or Firm* — McKee, Voorhees & Sease, P.L.C.

(57) ABSTRACT

A wind turbine tower system is provided which includes a wind turbine tower with a height of at least 80 meters, said wind turbine tower comprised of ultra-high performance concrete and a wind turbine mounted on the wind turbine tower. The wind turbine tower system may include a vertically extending lattice structure formed of a plurality of modular components, wherein each of said plurality of modular components being pre-stressed. The tower may also be formed using UHPC shells.

6 Claims, 7 Drawing Sheets

WIND TURBINE TOWER SYSTEM

CROSS-REFERENCE TO RELATED APPLICATIONS

This application claims priority under 35 U.S.C. §119 to provisional application Ser. No. 61/488,939 filed May 23, 2011, herein incorporated by reference in its entirety.

FIELD OF THE INVENTION

The present invention relates to wind turbine towers systems and more particularly, but not exclusively, to the structure of the towers and the use of ultra-high performance concrete (UHPC) in the towers.

BACKGROUND

As wind turbines are continued to be placed at higher elevations, the need for taller wind turbine towers becomes necessary. Taller towers expose turbines to higher velocities of wind and likely increased operating time, both of which result in increased power production. However, there are multiple challenges associated with extending the currently used 262 foot (80 meter) tall tubular steel towers to greater elevations.

For example, there are significant transportation costs associated with steel. These include not merely the cost of transportation which can be significant as often materials must travel long distances, but also practical limitations on steel tower size such as those associated with highway clearance issues. Another issue with steel is its vulnerability to fatigue and thus its limited design life. Increasing the design life of steel towers will also increase the tower cost.

What is needed are alternative tower designs and/or construction materials which overcome these problems.

SUMMARY OF THE INVENTION

Therefore, it is a primary object, feature, or advantage of the present invention to provide leap forward improvements over the state of the art.

It is a further object, feature, or advantage of the present invention to provide for wind turbine tower designs which use UHPC.

It is a further object, feature, or advantage of the present invention to provide a wind turbine tower suitable for use to provide hub heights of 80 meters or more.

A still further object, feature, or advantage of the present invention is to provide wind turbine towers which provide a cost-effective alternative to steel towers which provide numerous challenges especially for taller towers.

Another object, feature, or advantage of the present invention is to provide a tower which is modular such that multiple pieces compose any given cross section and/or vertical segment.

Yet another object, feature, or advantage of the present invention is to enable wind turbines to be supported cost effectively at hub heights of 80 meters and above while resisting the loads from wind turbine, gravity-, and/or wind forces.

A still further object, feature, or advantage of the present invention is to provide a reliable and cost effective means to elevate a wind turbine to a height sufficient to efficiently produce energy from the wind.

Another object, feature, or advantage of the present invention is to provide a wind turbine tower with increased longevity relative to steel.

Yet another object, feature, or advantage of the present invention is to provide a wind turbine tower that may be disassembled and reused at a different location.

A further object, feature, or advantage of the present invention is to provide a wind turbine tower which uses less material than a regular strength concrete tower.

A still further object, feature, or advantage of the present invention is to provide a wind turbine tower with the potential for reduced construction costs.

A still further object, feature, or advantage of the present invention is to provide a wind turbine tower with reduced transportation and site development costs relative to normal concrete wind turbine towers.

Another object, feature, or advantage of the present invention is to provide a wind turbine tower which has the potential for a longer life span.

These and or other objects, features, or advantages of the present invention will become apparent from the specification and claims that follow. No single aspect or embodiment of the present invention need exhibit each and every one of these objects, features, and advantages.

According to one aspect of the present invention, a wind turbine tower system is provided. The wind turbine tower system includes a wind turbine tower with a height of at least 80 meters, said wind turbine tower being comprised of ultra-high performance concrete elements. The system further includes a wind turbine mounted on the wind turbine tower.

According to another aspect of the present invention, a wind turbine tower system is provided. The wind turbine tower system includes a vertically extending lattice structure formed of a plurality of modular components, wherein each of said plurality of modular components being pre-stressed and a wind turbine mounted on the wind turbine tower. The modular components may include a plurality of columns with varying sections and a plurality of braces between adjacent columns with the columns comprising ultra-high performance concrete. The braces may be made from steel, normal concrete or ultra-high performance concrete as structural elements or panels with or without prestressing.

DETAILED DESCRIPTION

Figure 1:
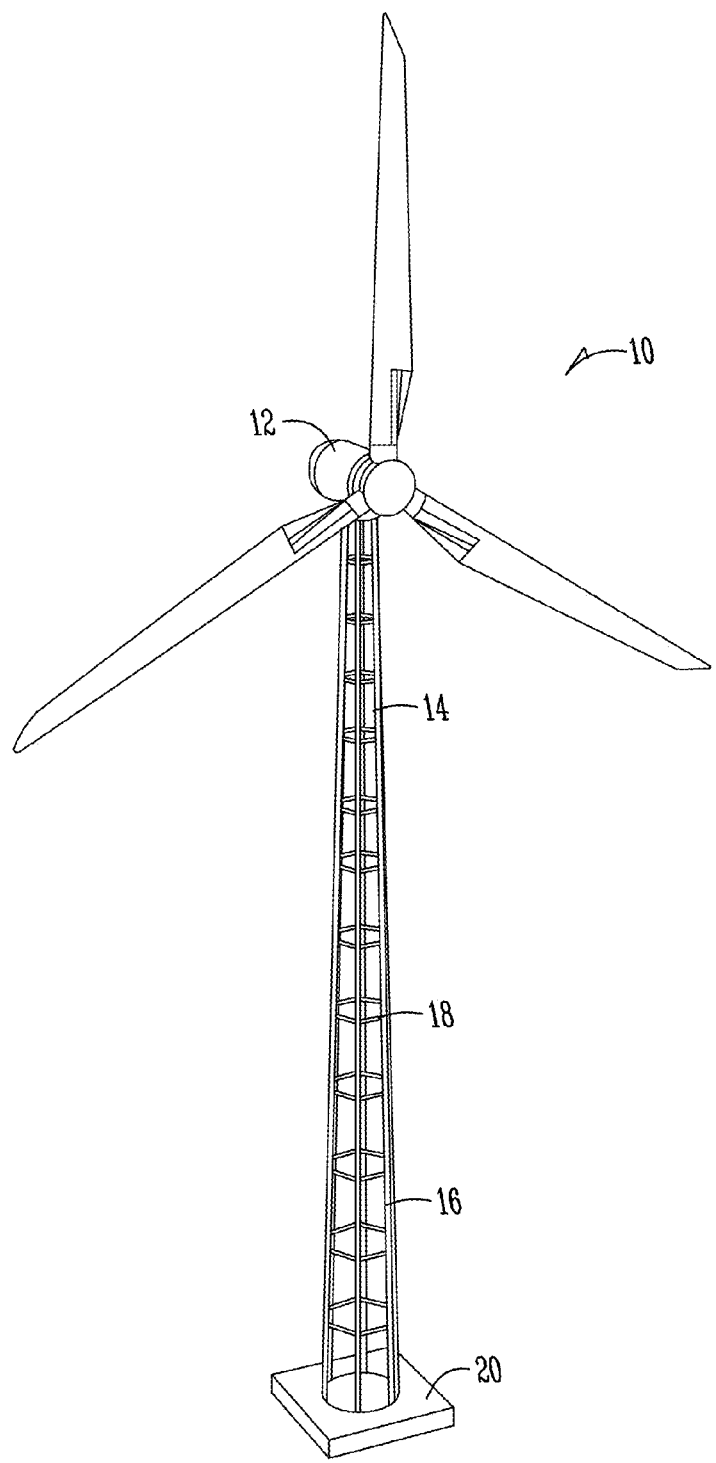
FIG. 1 illustrates one embodiment of a UHPC tower of the present invention.

The present invention provides for improved wind turbine towers using UHPC. UHPC is described in various references including WO 95/01316, herein incorporated by reference in its entirety. The name Ultra-High Performance Concrete is used broadly to define concrete possessing compressive strength greater than 21.8 ksi (150.3 MPa). The present invention provides various types of UHPC towers. These include UHPC shell towers and UHPC lattice towers. These include UHPC shell towers and UHPC lattice towers.

Baseline 322 ft (98.2 m) tall concrete and steel designs have been developed so that any UHPC tower design can then be compared directly to them. To facilitate this comparison, both UHPC tower embodiments have been designed for the same wind turbine, the ACCIONA Windpower AW109/3000, as the concrete/steel alternatives. Additionally, they have been designed for the same surface roughness (class D) and wind speed load cases (EWM50 and EOG50). Of course, the present invention contemplates variations in the designs as may be appropriate for a particular height, a particular wind turbine, surface roughness, wind speed load, or other parameters.

UHPC Shell Tower

The UHPC Shell tower is an extension of the 322 ft. (98.2 m) pre-stressed concrete tower. It does not represent a radical new design, but rather seeks to refine current designs using an innovative material. The UHPC Shell concept was designed as a bonded, post-tensioned structure.

Design of the UHPC shell tower took into account loading, service-level moment capacity, ultimate moment capacity, service-level shear cracking, ultimate shear capacity, ultimate torsional moment capacity, torsion and shear interaction, fatigue, and dynamic properties.

The design of the UHPC shell tower identified various advantages relative to concrete and steel towers. The results for the UHPC Shell Tower yielded a design that uses only 31.9% of the material used in a regular strength concrete design. While this represents a more efficient use of resources, it also implies drastically reduced transportation and construction costs. The UHPC Shell tower's weight is very close to that of a steel tower: 866 kips (3850 kN) vs. 739 kips (3290 kN), respectively.

Fatigue is never the governing limit state for the design of the UHPC shell. The UHPC Shell tower's fatigue life is $5.63 \times 10^{13}$ cycles, much greater than that of the wind turbine itself, and is controlled by the fatigue of the steel tendons. This long fatigue life would allow the tower to outlast the typical turbine 20 year design life, implying the tower could be used with multiple turbines over its life cycle.

Shear and torsion interaction governs the upper portion of the tower design. This is due to the material's excellent compressive strength, which allows for slender sections with high flexural resistance. However, as shear resistance is related to the square root of compressive strength, it was not unexpected that the shear becomes critical. This is not observed in the concrete tower, as larger wall thicknesses are necessary for moment resistance.

The natural frequency of the UHPC shell tower, 0.372 Hz, was well within the working frequency range for a 3 MW turbine.

The UHPC Shell deflection was somewhere between the 322 ft. (98.2 m) steel and concrete tower deflections. The UHPC Shell tower design may be appropriately refined for applications requiring small deflections. For example, if the turbine manufacturer required a smaller deflection for the tower, this could be achieved by increasing its base diameter and the volume of UHPC and prestressing steel.

UHPC Lattice Tower

The present invention also provides for using UHPC in lattice towers. The lattice tower provides an alternative to the UHPC shell tower which allows for efficient use of UHPC while limiting lateral tower deflection and improving its constructability. While the UHPC Shell design represents a more direct conversion of current steel and concrete designs, the Lattice Tower is a significant departure from standard practice. The lattice tower allows for potential savings in materials, transportation, and erection costs.

The general concept of the Lattice Tower is to concentrate the UHPC into six columns. These columns utilize unbonded post-tensioning, and are tied together intermittently using bracing. If sufficiently braced, the columns will act compositely, and resist lateral loads as a whole. Depending on the direction of loading, half of the columns will generally be subjected only to tension, while the others experience compression. As long as these members do not act independently of each other, they can remain relatively slender. A pictorial representation of the Lattice Tower with cross braces is shown in FIG. 1.

Figure 2:
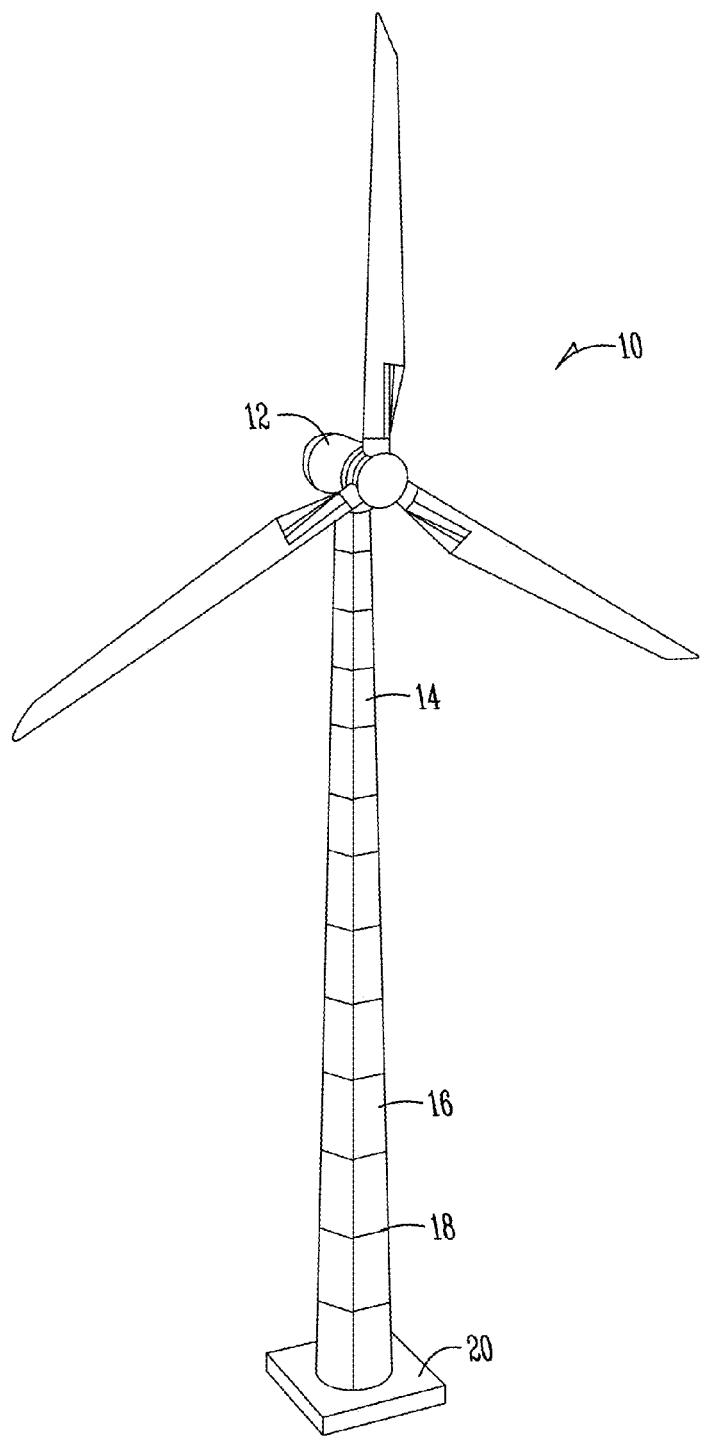
FIG. 2 illustrates the embodiment of the UHPC tower of FIG. 1 with panels present.

In FIG. 1, a wind turbine tower system 10 is shown which includes a wind turbine 12 supported on a wind turbine tower 14. The wind turbine tower 14 includes a plurality of columns 16 extending from a base 20. The plurality of columns 16 are braced together with bracing members 18. Although FIG. 1 depicts the tower with only horizontal bracing members, multiple options exist for bracing the UHPC columns. For example, an open-air concept would combine the horizontal bracing members shown in FIG. 1 with diagonal cross bracing. The horizontal and cross bracing could be formed from concrete, steel, or even UHPC members. For aesthetic reasons, the tower could then be wrapped in a structural fabric, giving it the appearance of typical wind turbine towers seen today. Alternatively, concrete or thin UHPC panels could span between the columns, connected intermittently through the use of pinned connections. FIG. 2 is a pictorial representation of the wind turbine tower where panels 22 are present.

Design of the UHPC lattice tower took into account loading, service-level moment capacity, ultimate moment capacity, service-level torsion and shear cracking, fatigue of the columns, and dynamic properties.

Figure 3:
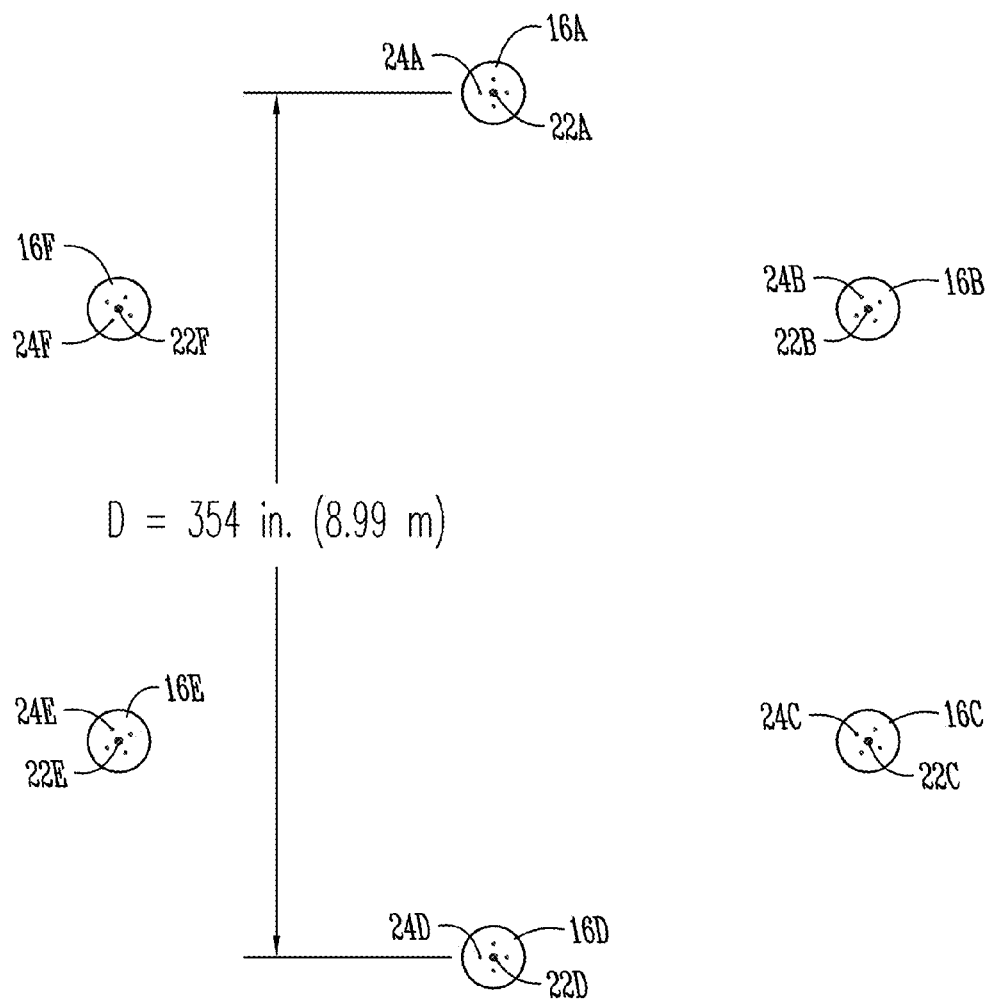
FIG. 3 through FIG. 6 illustrate the cross section of the UHPC tower of FIG. 1.
Figure 4:
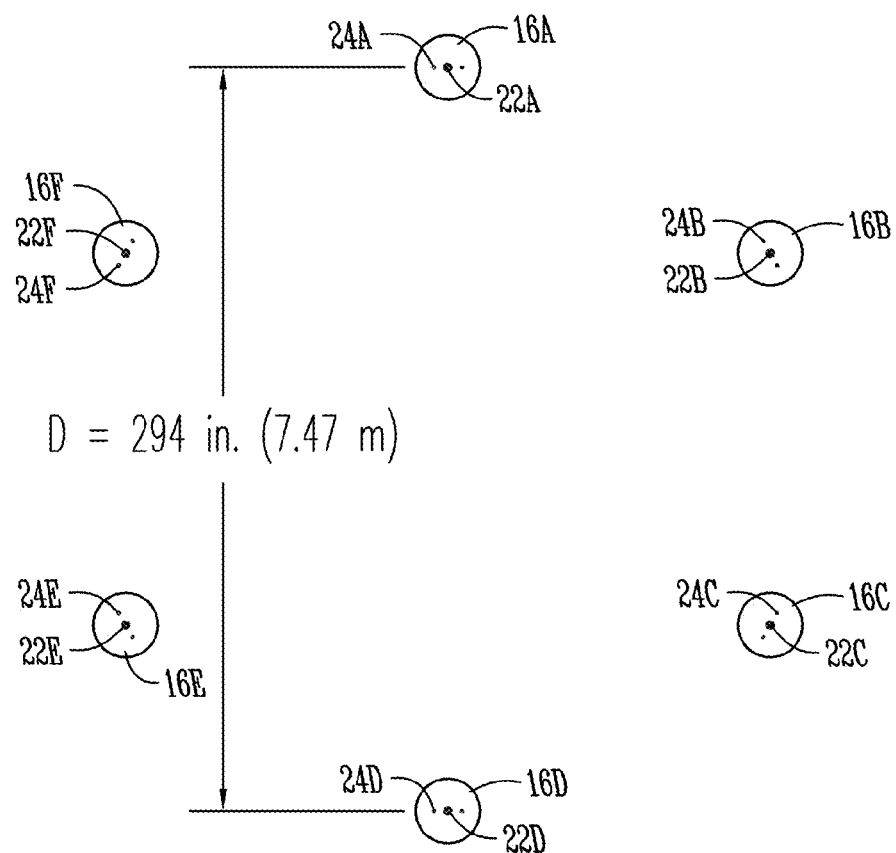
Figure 5:
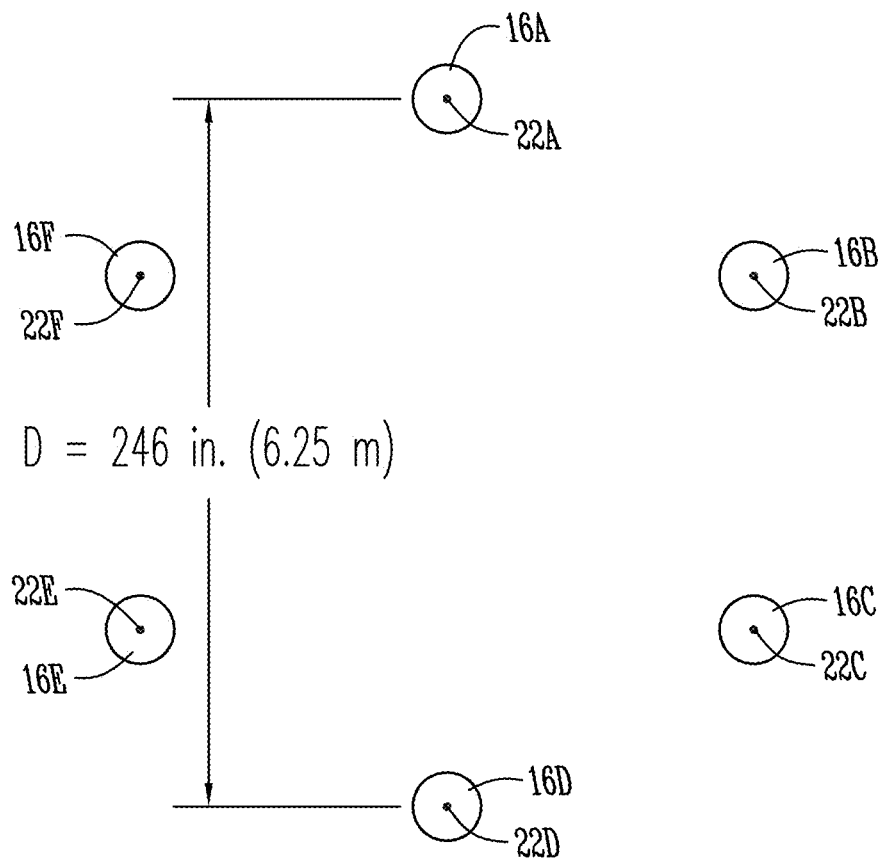
Figure 6:
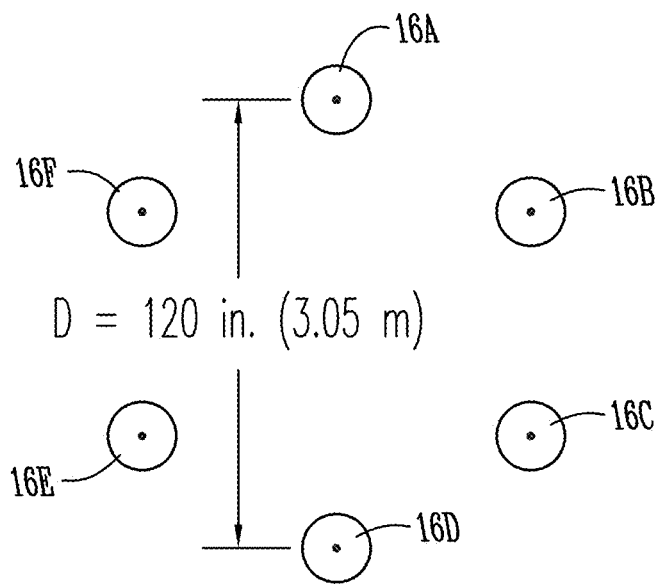
Figure 7:
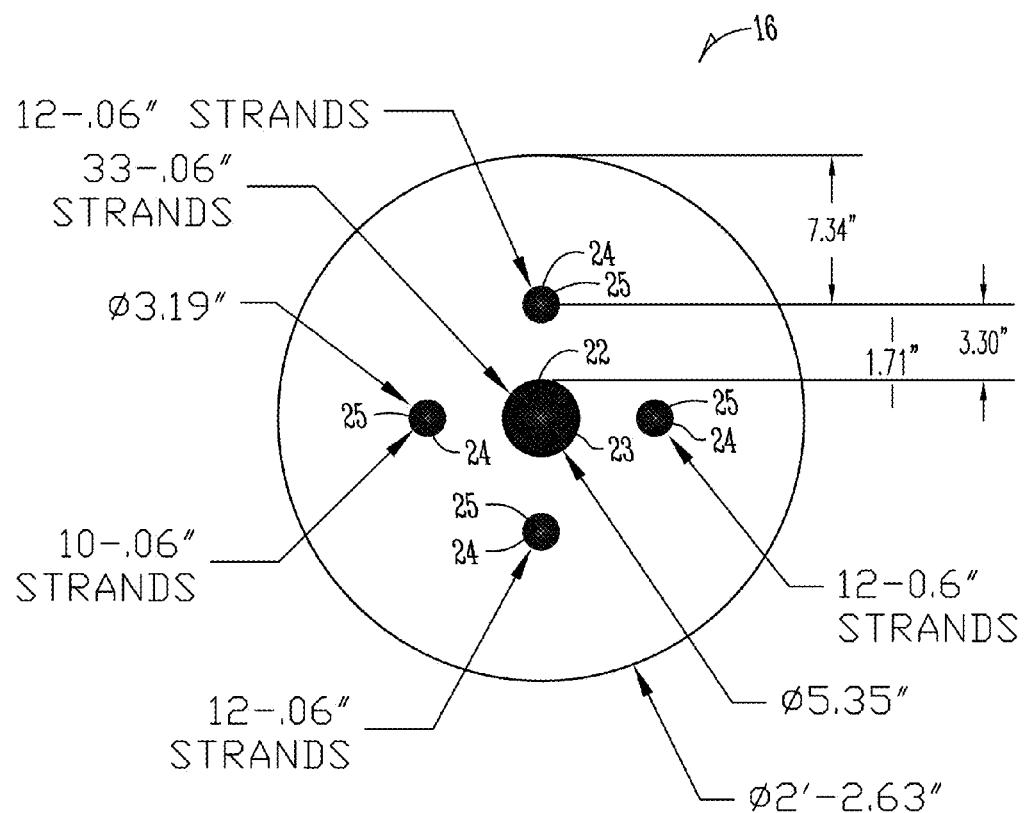
FIG. 7 is a detailed drawing illustrating a circular column of the UHPC tower of FIG. 1.

The cross sections of the tower are shown in FIG. 3 through FIG. 6. FIG. 3 illustrates the cross section of the UHPC lattice tower at the base with columns 16A-16F. There are preferably embedded ducts through each column. Post-tensioning tendons 22A-22F, 24A-24F are shown running through the ducts. FIG. 4 illustrates the cross section of the UHPC lattice tower at 110 feet (33.5 m) after post-tensioning tendon termination. Note that there are fewer post-tensioning tendons shown. FIG. 5 illustrates the cross section of the UHPC lattice tower at 220 feet (67.1 m) after post-tensioning tendon termination. Note that there are fewer post-tensioning tendons shown. FIG. 6 illustrates the cross section of the UHPC lattice tower at the tower top. In order to take advantage of UHPC's high compressive strength, each column was designed with unbonded post-tensioning tendons running through embedded ducts along the entire tower length. A portion of these tendons are terminated at 110 ft. (33.5 m) and 220 ft. (67 m) in order to increase the economy of the tower. A detailed drawing of an individual column is shown in FIG. 7. Note that in FIG. 7, a cross-section of a column 16 is shown with the ducts 23, 25 and corresponding post-tensioning tendons 22, 24. The use of unbonded reinforcement was chosen for the UHPC Lattice tower in order to allow the tower to be disassembled, moved, and reassembled at another location were the environmental conditions, i.e., wind speed, surrounding the tower to change over its design life. The UHPC Lattice tower is more suited to this concept than the concrete and UHPC Shell towers due to its small member sizes. Another advantage of unbonded post-tensioning is the elimination of concentrated steel stresses. Since the steel stress is distributed along the entire tower length, it is expected that even in an ultimate load condition, the post-tensioning steel will not yield. Since it remains elastic, the post-tensioning steel will then restore the tower to its original position when the ultimate load or extreme load such that due to earthquake is removed.

The UHPC Lattice tower may be compared to the UHPC Shell, concrete, and steel designs. An interesting aspect of the UHPC Lattice tower is the increased wind load on the tower, as compared to the UHPC Shell Design. While the Lattice Tower has a truss-like layout, its overall width is larger than the UHPC Shell Tower. Additionally, the UHPC Shell tower enjoys a lower force coefficient. Although the UHPC Lattice tower has less surface area, its components attract higher wind forces.

Without considering the volume of material required for bracing, the Lattice tower uses less UHPC than the UHPC Shell. It is important to note however that the Lattice Tower uses bracing, which will add increased cost and labor to the design. The choice of bracing material, as well as connections could significantly affect the overall price of the UHPC Lattice Tower.

As with the UHPC Shell Tower, fatigue is never a governing limit state for design. This implies the tower could be used with multiple turbines over the course of its design. Additionally, due to its use of unbonded post-tensioning, it could be dismantled and reassembled at another site as previously mentioned. Long fatigue life makes both of these options a possibility.

The Lattice Tower design has an estimated natural frequency of 0.495 Hz, within the working range of 0.242 Hz to 0.594 Hz for a 3.0 MW turbine. This indicates that the turbine top loads, and more specifically the assumed dynamic amplification, are valid for the structure.

Deflection of the UHPC Lattice Tower is significantly lower than the UHPC Shell tower. This is due to the increased base diameter and therefore the increased lateral stiffness of the UHPC Lattice tower, as compared to the UHPC Shell tower.

Thus, improved wind turbine towers have been described. Although various embodiments are shown and described it should be apparent that the present invention contemplates numerous variations, options, and alternatives in tower design. Examples of the present invention include towers formed from UHPC including both shell towers and lattice towers. The present invention contemplates variations in tower size and height, including heights over 80 meters, heights over 90 meters, and heights over 100 meters. The present invention contemplates variations in the specific materials used and numerous variations in design parameters as may be appropriate in particular applications.

What is claimed is:

1. A wind turbine tower system comprising:
a wind turbine tower with a height of at least 80 meters, the wind turbine tower having a vertically extending lattice structure formed of a plurality of modular components, wherein each of said plurality, of modular components being pre-stressed;
a wind turbine mounted on the wind turbine tower;
wherein tile plurality of modular components includes a plurality of vertical columns, each of the plurality of vertical columns comprising concrete and extending from a base of the wind turbine tower to a top of the wind turbine tower, and the plurality of vertical columns arranged to provide a multi-sided polygonal cross-section;
wherein the plurality of modular components further include a plurality of braces between adjacent columns;
wherein for each of the columns cross-section area decreases from a base of the wind turbine tower to a top of the wind turbine tower;
wherein each of the columns comprises a plurality of ducts with tendons running through the ducts to provide post-tensioning and configured to provide staged post-tensioning such that fewer ducts and tendons are present in successively higher stages of the columns.

2. The wind turbine tower system of claim 1 wherein the wind turbine tower having a height of at least 90 meters.

3. The wind turbine tower system of claim 1 wherein the wind turbine tower having a height of at least 100 meters.

4. The wind turbine tower system of claim 1 further comprising a plurality of flat panels operatively connected between adjacent columns within the plurality of the columns.

5. The wind turbine tower system of claim 4 wherein the plurality of panels comprise ultra-high performance concrete, the ultra-high performance concrete having a compressive strength of greater than 150 megapascal (MPa).

6. The wind turbine tower system of claim 1 wherein the columns comprise ultra-high performance concrete, the ultra-high performance concrete having a compressive strength of greater than 150 megapascal (MPa).

* * * * *